Sept. 17, 1957 J. D. RUTLEDGE 2,806,648
HALF-ADDER FOR COMPUTING CIRCUIT
Filed April 19, 1954
FIG. 1.
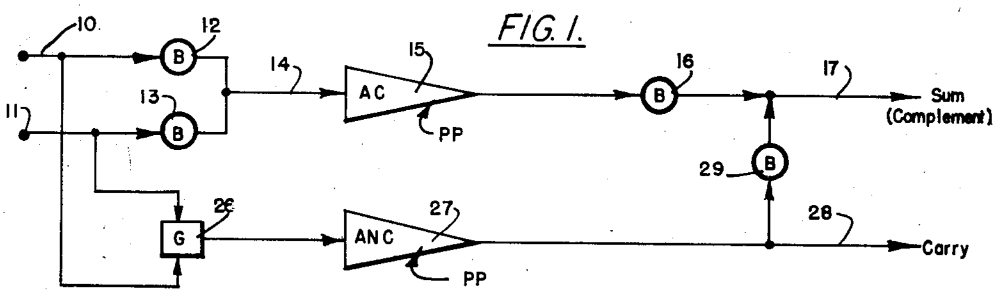
FIG. 2.
FIG. 3.
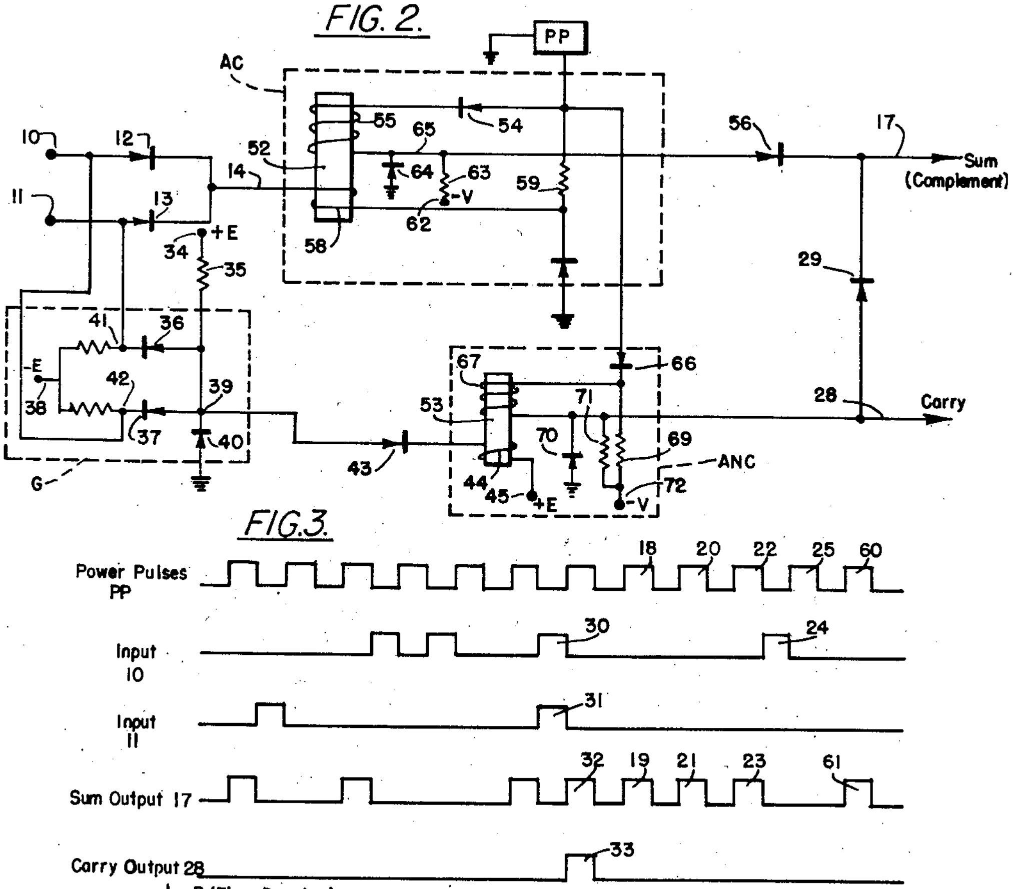
FIG. 4.
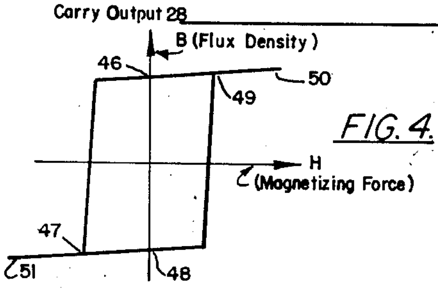
INVENTOR
JOSEPH D. RUTLEDGE
ATTORNEY 2,806,648

HALF-ADDER FOR COMPUTING CIRCUIT

Joseph D. Rutledge, Darling, Pa., assignor to Sperry Rand Corporation, New York, N. Y., a corporation of Delaware Application April 19, 1954, Serial No. 424,035

4 Claims. (Cl. 235—61)

This invention relates to half-adders for computing circuits. The function of a half-adder in a computing circuit is described on pages 270–272, 288 and 289 of the textbook "High Speed Computing Devices" by the staff of Engineering Research Associates, Incorporated, published by McGraw-Hill Book Company (1950).

While the present invention particularly relates to half-adders involving magnetic amplifiers as the important components thereof, it is not the first device utilizing an arrangement of magnetic amplifiers in order to produce a half-adder. In the prior application of H. W. Kaufmann, Serial No. 423,422 filed April 15, 1954, entitled, "Half-Adders for Computers," assigned to the same assignee as the present invention, there is disclosed a half-adder for computers in which the principal components are magnetic amplifiers.

The present invention is an improvement over the one of this prior application and has as its primary object the provision of a simpler half-adder than the one shown in the prior application.

Another object of the invention is to provide a half-adder primarily capable of use in different circuits than the half-adder of the aforesaid prior application.

Another object of this invention is to provide a half-adder that does not have any component parts that are liable to burn out.

Still another object of this invention is to provide a half-adder that is low in cost.

Another object of the invention is to provide a half-adder in which the component parts include magnetic amplifiers whereby the advantage of that type of component is obtained.

Another object of the invention is to provide a half-adder that is very efficient and effective in operation.

Still another object of the invention is to provide a half-adder employing magnetic amplifiers in which "carry" output is indicated by a pulse of energy, as distinguished from the absence of a pulse.

Still another object of the invention is to provide a half-adder employing magnetic amplifiers in which the "sum" output is a signal which has pulses to indicate the absence of a "sum," the absence of pulses indicating zero "sum."

Still another object of the invention is to provide a half-adder employing magnetic amplifiers in which the "carry" output utilizes pulses to indicate a "carry" digit as distinguished from a "carry" output in which the absence of a pulse represents a "carry" digit, and in which the "sum" output is a signal in which the absence of pulses indicates that there is a "sum."

The present application utilizes magnetic amplifiers of the general types described in the following two applications: Theodore H. Bonn and Robert D. Torrey, Serial No. 408,858, filed January 8, 1954, entitled Signal Translating Device; and John Presper Eckert, Jr. and Theodore H. Bonn, Serial No. 382,180 filed September 24, 1953, entitled Signal Translating Device. These applications are assigned to the assignee of the present application. Briefly speaking, the invention employs a first magnetic amplifier which normally transmits a series of power pulses to the "sum" output. It is only when there is a signal on the input of this magnetic amplifier that it interrupts the train of power pulses to the "sum" output. The two inputs, which receive the two signals to be added, have means associated with them for triggering this first magnetic amplifier and stopping the output thereof when a signal is received on either one of the inputs. Therefore, this first magnetic amplifier transmits a series of power pulses to the "sum" output until a signal is received on one of the two inputs. In other words, the "sum" output is a "complement" output in which a pulse indicates that there is no "sum" digit and the lack of a pulse indicates such a digit. There is a second magnetic amplifier which normally produces no pulses in its output. It is triggered by a diode gate energized from the two input terminals. When there are signals on both input terminals, the diode gate becomes conducting and triggers the second magnetic amplifier to produce a "carry" signal. This "carry" signal involves a pulse whenever there is a "carry" digit, and the absence of a pulse indicates the absence of a "carry" digit. By means of a rectifier, the "carry" signal is fed to and added onto the "sum" output in order that there will be a signal on the "sum" output whenever there is a "carry" digit. Since a pulse on the "sum" output indicates the lack of a "sum," it is clear that the aforesaid apparatus functions as a half-adder. In other words, when there is a "carry" digit, there is a signal in the "sum" output which in this case indicates the lack of a "sum."

In the drawings:

Figure 1 is a block diagram of the invention;

Figure 2 is a schematic diagram of the invention;

Figure 3 illustrates the wave forms involved in the apparatus; and

Figure 4 illustrates the hysteresis loop of the cores used in the magnetic amplifiers.

Referring first to the block diagram of Figure 1, it is noted that the "complementing" magnetic amplifier 15 passes a continuous series of power pulses PP through buffer 16 to the "sum" output 17, in the absence of a signal on wire 14. The two binary signals to be added, which may have the wave form shown in Figure 3, are fed onto terminals 10 and 11 and respectively pass through buffers 12 and 13 to wire 14. If there is a signal on either one of these inputs, the next succeeding power pulse from amplifier 15 is interrupted. This is clearly illustrated in Figure 3 where it is noted that power pulses PP occur at 18, 20 and 22 respectively, producing "sum" output pulses at 19, 21 and 23. However, when input pulse 24 occurs at input 10, the next succeeding power pulse 25 does not flow to the "sum" output 17. When input pulses occur simultaneously at input terminals 10 and 11, the diode gate 26 becomes conducting and triggers the non-complementing amplifier 27 so that the latter allows the next power pulse to flow to the "carry" output 28. Such an output pulse also flows through buffer rectifier 29 to the "sum" output 17. This is clearly illustrated in Figure 3 which shows the inputs 10 and 11 as having received input pulses 30 and 31. These cause a pulse 32 at the "sum" output 17 and a pulse 33 at the "carry" output 28.

It follows from the foregoing that when there is no signal on either input, there will be no signal at the "carry" output 28, and there will be continuous series of power pulses at the "sum" output 17. When there is a pulse on just one of the input terminals 10 or 11, there will be a pulse on wire 14 which will interrupt the next power pulse through amplifier 15 and give an indication in the "sum" output 17 by the absence of a pulse. When there are simultaneous input pulses on both terminals 10 and 11, the amplifier 27 allows the next power pulse to pass to the "carry" output 28, indicating a "carry" digit and also to pass to the "sum" output 17, indicating the lack of a "sum."

Referring now to the details of the schematic diagram of Figure 2, it is noted that if a positive impulse signal appears on input terminal 10, it will pass through rectifier 12 to wire 14. Likewise, if such a signal appears on input terminal 11 it will pass through rectifier 13 to wire 14. Hence, wire 14 will be energized if either one of the terminals 10 or 11 is energized by a positive impulse.

In the event there are no input pulses on terminals 10 and 11, current will flow from positive terminal 34 through rectifiers 36 and 37, to negative pole 38. The resistance values are such that in this case the connection 39 will be negative except for the fact that rectifier 40, in effect, grounds any negative potential at connection 39, hence, connection 39 will be at substantially ground potential. If a pulse is received on terminal 11, but no pulse is simultaneously received on terminal 10, the potential at point 41 will be moved positively so that rectifier 36 becomes non-conducting. However, current continues to flow through rectifier 37 and this causes connection 39 to tend to be nearer to the negative pole 38 than to the positive pole 34, hence the potential on point 39 is negative and is grounded through rectifier 40. Hence, the potential at connection 39 is only a very small negative value, substantially at ground potential. On the other hand, if positive pulses are simultaneously received on both of input terminals 10 and 11, both of points 41 and 42 will be raised to high positive values and no current will flow through rectifiers 36 and 37. Hence, connection 39 acquires a high positive potential. A current then flows from positive pole 34, resistor 35, rectifier 43, coil 44 to positive pole 45 which has a lower potential than positive pole 34. Current flows in the latter path only when input terminals 10 and 11 are simultaneously energized by positive pulses. The magnetic cores 52 and 53, may be made of a variety of materials, among which are the various types of ferrites and the various magnetic tapes, including Orthonik and 4–79 Moly-Permalloy. These materials may have different heat treatments to give them different properties. The magnetic materials employed in the cores should preferably, though not necessarily, have a substantially rectangular hysteresis loop (as shown in Figure 4). Cores of this character are now well known in the art. In addition to the wide variety of materials available, the core may be constructed in a number of geometries including both closed and open paths; for example, cup-shaped, strips, and toroidal-shaped cores are possible. Those skilled in the art understand that when the core is operating on the horizontal (or substantially saturated) portions of the hysteresis loop, the core is generally similar in operation to an air core in that the coil on the core is of low impedance. On the other hand, when the core is operating on the vertical (or unsaturated) portions of the hysteresis loop, the impedance in the coils on the core will be high.

Assume that the core 52 of the complementing amplifier AC has a hysteresis loop as shown in Figure 4, and that the magnetizing force on the core is at point 46 at the start of the operation. The next positive pulse from the power source PP flows through rectifier 54, coil 55, rectifier 56, to "sum" output 17. This magnetizes the core positively and drives it to saturation at point 50 on Figure 4. During the entire period of this pulse, the core was operating on a substantially horizontal or saturated portion of its hysteresis loop, and therefore the coil 55 had low impedance. As a result, there was a large output at 17. This operation will continue as long as no signal appears on wire 14, because each succeeding power pulse drives the core from 46 to 50, and during the spaces between pulses the magnetizing force on the core drops back to zero at 46.

If it is now assumed that, between two power pulses, a triggering pulse appears on either of inputs 10 or 11 it will flow to wire 14. Such a pulse will cause coil 58 to magnetize the core negatively, driving it from point 46 to 47 on the hysteresis loop. At the termination of the triggering pulse on wire 14, the magnetizing force on the core will return to zero and to the point 48 on the hysteresis loop. The next power pulse from source PP is insufficient to magnetize the core positively beyond point 49. The core operates over an unsaturated portion during the period of this pulse. At such time interval the coil 55 on the core has very high impedance and practically no current can flow from the source PP to the output 17.

The foregoing is consequently a clear explanation of the reason why the pulse 24 (Figure 3) caused the power pulse 25 to fail to appear at output 17. Following pulse 24, the pulse 25 will drive the core from point 48 to 49 on the hysteresis loop, hence at the end of pulse 25 the magnetizing force on the core will return to zero at point 46. The next power pulse 60, being positive, will drive the core from point 46 to point 50 along the saturated portion of the hysteresis loop and will therefore produce an output pulse 61 at 17. It follows that power pulses will appear in the "sum" output from coil 55 whenever no signal appears on wire 14, but the next pulse from source PP following a pulse on wire 14 will be blocked. During the time that coil 55 has high impedance and therefore blocks flow of power pulses therethrough, it is of course understood that normally a small flow of current would result and in the absence of some means to prevent it, this current would flow to output 17 and create a small output current. This may be called a "sneak" current. It may be eliminated by utilizing resistor 63 in conjunction with rectifier 64 and negative potential source 62. The negative source 62 causes current to flow from ground through rectifier 64 and resistor 63. This current is somewhat larger than said "sneak" current and therefore eliminates the same.

The operation of non-complementing amplifier ANC will now be described. The power pulses from source PP are positive as in the previous case and pass through rectifier 66, coil 67, resistor 71, to negative pole 72. If we assume that at the start of this pulse the core was at point 48 on its hysteresis loop, it will be driven to point 49. At the end of this pulse, it will return to zero value 46. At the conclusion of that pulse, current will now flow in the following circuit: negative pole 72, resistor 69, coil 67, rectifier 70 to ground. This is a flow in the opposite direction from that of the previous pulse and drives the core negatively from point 46 to point 47. At the conclusion of this reverse pulse, the next power pulse will again drive the core positively from point 47 through point 48 to point 49, and from thence it will go to 46, after the conclusion of the pulse. The next action will be another flow of current in the following circuit: pole 72, resistor 69, coil 67, rectifier 70 to ground. Hence, the magnetizing force on the core will repeatedly go around the hysteresis loop and the majority of the time it will be operating on unsaturated portions of the hysteresis loop, consequently there will be substantially no output at 28. If however an input signal is received in coil 44, at a time when the core is at point 46, the reverse current from pole 72 will not drive the core negatively to point 47 as usual. In such situation, there will be two opposite magnetizing forces on the core. On the one hand there will be a flow of current in the circuit: pole 72, resistor 69, coil 67, rectifier 70 to ground, tending to magnetize the core negatively. There will be an additional current from coil 44 tending to magnetize the core positively. These two magnetizing forces will cancel each other and the core will remain at point 46 on the hysteresis loop. Consequently, the next effective power pulse will pass through rectifier 66 and coil 67 to output 28. It will drive the core from point 46 to point 50 and the core is substantially saturated throughout this entire period. It follows, therefore, that a large pulse output will appear at 28. Therefore, we may summarize the operation of non-complementing amplifier ANC by stating that there will be current that will drive the core around the hysteresis loop without substantial saturation and therefore without any substantial pulse output until there is a current flow through coil 44. This will stop the alternating magnetizations of the core, allowing the next power pulse to saturate the core and give it a large output at 28. Whenever there is a pulse output at 28, it will flow through rectifier 29 and produce an output at 17, as previously described. Summarizing the operation of the entire system by reference to the schematic diagram of Figure 2, it is noted that normally the magnetic amplifier A. C. is conducting and positive pulses flow from source PP through coil 55, rectifier 56 to the "sum" output 17. This creates a series of "sum" output pulses which occur without interruption until a signal appears on wire 14. A signal appears on wire 14 in the event one or both of input terminals 10 or 11 is energized by a positive pulse. Such a pulse greatly reduces the flow of current through coil 55 and creates an interruption in the continuous train of output pulses at 17. This indicates a "sum" output. In the event there are input signals on both inputs 10 and 11, there will be a "carry" output and also a signal to fill in the interruption in "sum" output 17. That occurs as follows. Simultaneous signals on inputs 10 and 11 allow current to flow in the circuit: 45, 44, 43, 39, 35 and 34. This is by reason of the fact that the diode gate 36—37 is blocked. The non-complementing amplifier ANC does not produce any output pulses until a signal is received on coil 44. Receipt of such a signal causes a signal in "carry" output 28 which indicates a "carry" digit. Such signal also flows through rectifier 29 to the "sum" output 17 and fills in the interruption that would otherwise occur in that signal.

There is produced, therefore, an interruption in the "sum" output 17 each time a signal appears on just one of the input terminals 10 and 11. There is a "carry" output pulse on 28, as well as a pulse at "sum" output 17, whenever pulse signals are simultaneously received on input terminals 10 and 11. Whenever no signals are transmitted to terminals 10 and 11, there is a continuous train of power pulses at output 17 and no output pulses at "carry" output 28. The device therefore functions as a half-adder.

I claim to have invented:

1. A half-adder comprising first and second input terminals, means for giving an indication in response to pulses on either of said terminals, means including a first magnetic amplifier for producing a series of output pulses which series is temporarily interrupted each time the first named means indicates a pulse on one of said terminals, means for giving an indication in response to pulses on both of said terminals simultaneously, means including a second magnetic amplifier for producing an output pulse whenever the third named means indicates pulses were simultaneously received on both input terminals, and means for inserting any output pulse of the fourth named means into the output of the second named means.

2. A half-adder comprising a source of power pulses, first and second inputs, a sum output, a carry output, a complementing magnetic amplifier that normally allows said power pulses to pass through it to the sum output, means responsive to a signal representing a digit to be added on either of the inputs for triggering said complementing amplifier to temporarily interrupt the flow of power pulses therethrough, a non-complementing magnetic amplifier that allows power pulses to pass from said source to the carry output only when the non-complementing amplifier is triggered, means responsive to signals that indicate digits at both inputs for triggering the non-complementing amplifier, and means for inserting any pulse of the carry output into the sum output.

3. A half-adder as defined in claim 2 in which the last named means is a rectifier.

4. A half-adder comprising a source of evenly spaced power pulses, first and second inputs, a sum output, a complementing magnetic amplifier connected to the positive side of said source for normally feeding sum output pulses to the sum output, rectifiers connecting said inputs to said amplifier to trigger the latter and temporarily interrupt the flow of power pulses therethrough in response to a positive pulse on either of said inputs, a carry output, a non-complementing magnetic amplifier that allows a power pulse to flow from the positive side of said source to the carry output when the non-complementing magnetic amplifier is triggered, means including a diode gate for triggering the non-complementing amplifier in response to positive pulses on both of said inputs, and a rectifier for transmitting any positive pulses occurring at the carry output to and inserting them into the sum output signal.

References Cited in the file of this patent

UNITED STATES PATENTS

| | | |
|---|---|---|
| 2,610,790 | Elliott | Sept. 16, 1952 |
| 2,646,501 | Eckert | July 21, 1953 |
| 2,673,293 | Eckert | May 23, 1954 |
| 2,696,347 | Lo | Dec. 7, 1954 |

FOREIGN PATENTS

| | | |
|---|---|---|
| 701,851 | Great Britain | Jan. 6, 1954 |

OTHER REFERENCES

Proc. of IRE (note Fig. 13), page 1319, October 1953.

Proc. of IRE (note Fig. 96), pages 19 and 20, January 1952.